United States Patent [19]
Kurita

[11] Patent Number: 5,934,396
[45] Date of Patent: Aug. 10, 1999

[54] CONTROL SYSTEM FOR VEHICULAR DRIVE UNIT

[75] Inventor: Kiyoshi Kurita, Anjo, Japan

[73] Assignee: Aisin AW Co., Ltd., Anjo, Japan

[21] Appl. No.: 08/755,015

[22] Filed: Nov. 22, 1996

[30] Foreign Application Priority Data

Dec. 8, 1995 [JP] Japan ................................ 7-345921

[51] Int. Cl.$^6$ .................................................. B60K 1/00
[52] U.S. Cl. .................... 180/65.2; 180/65.3; 701/22; 318/139
[58] Field of Search ................. 180/65.1, 65.2, 180/65.3, 65.4, 65.8; 701/22; 318/139

[56] References Cited

U.S. PATENT DOCUMENTS

| | | |
|---|---|---|
| 4,533,011 | 8/1985 | Heidemeyer et al. |
| 5,258,651 | 11/1993 | Sherman . |
| 5,285,111 | 2/1994 | Sherman . |
| 5,287,772 | 2/1994 | Aoki et al. ...................... 180/65.3 X |
| 5,359,308 | 10/1994 | Sun et al. ........................ 180/65.3 X |
| 5,654,887 | 8/1997 | Asa et al. ........................ 180/65.3 X |
| 5,664,635 | 9/1997 | Koga et al. ....................... 180/65.3 |

*Primary Examiner*—Kevin Hurley
*Assistant Examiner*—Avraham H. Lerner
*Attorney, Agent, or Firm*—Oliff & Berridge, PLC

[57] ABSTRACT

A control system for a vehicular drive unit comprising: an engine, a motor generator connecting to the output of the engine and acting as a power generator for recovering the energy from the wheels and as a motor for driving the output shaft of the engine, a battery for storing the energy recovered by the motor generator as electric power and for supplying electric power to drive the motor generator, a first clutch for connecting the motor generator and the wheels, stopping state detecter for detecting a stopping state of the vehicle, and a controller for controlling the engine, the motor generator and the first clutch. When the stopping state is detected by the stopping state detector, the controller releases the first clutch, sets the supply of a fuel to the engine to a predetermined rate lower than that of an idling RPM, and feeds electric power to the motor generator to maintain the rotation of the engine substantially at an idling RPM by the drive of the motor generator.

39 Claims, 12 Drawing Sheets

FIG. 10

| | C0 | C1 | C2 | B0 | B1 | B2 | B3 | F0 | F1 | F2 | REMARKS |
|---|---|---|---|---|---|---|---|---|---|---|---|
| P, N | × | × | × | × | × | × | × | × | × | × | |
| R | ○ | × | ○ | × | × | × | ○ | ○ | × | × | |
| D 1st Speed | ○ | ○ | × | × | × | × | (○) | ○ | × | ○ | |
| D 2nd Speed | ○ | ○ | × | × | (○) | ○ | × | ○ | ○ | × | |
| D 3rd Speed | ○ | ○ | ○ | × | × | ○ | × | ○ | × | × | F1 Locked to Prevent Reverse |
| D 4th Speed | × | ○ | ○ | ○ | × | ○ | × | × | × | × | F1 Locked to Prevent Reverse |

FIG. 13

|  |  | C₀ | C₂ | B₀ | B₁ | B₃ | F₀ | F₂ | REMARKS |
|---|---|---|---|---|---|---|---|---|---|
| P, N | | × | × | × | × | × | × | × | |
| R | | ○ | × | × | × | ○ | ○ | × | |
| D | 1st Speed | ○ | × | × | × | (○) | ○ | ○ | 1st in D-Range |
| | 2nd Speed | ○ | × | × | ○ | × | ○ | × | F2 Locked to Prevent Reverse |
| | 3rd Speed | ○ | ○ | × | × | × | ○ | × | |
| | 4th Speed | × | ○ | ○ | × | × | × | × | |

CONTROL SYSTEM FOR VEHICULAR DRIVE UNIT

BACKGROUND OF THE INVENTION

1. Field of the Invention

The invention relates to a vehicle drive unit provided with a combustion engine (as will be referred to as the "engine") and an electric-motor/generator (as will also be referred to as the "motor generator") and, more particularly, to a control system for performing a control to maintain the drive unit in a state in which the vehicle can be quickly restarted at a vehicle stopping time.

2. Description of the Related Art

As one mode of the vehicular drive unit, there is a drive unit in which an engine, a motor generator and a transmission are combined, as disclosed in U.S. Pat. No. 4,533,011. By using the motor generator as a power generator, this drive unit is constructed to recover the braking energy from wheels and store it as an electric power, so that the electric power is used for driving the motor generator to start the engine and drive the vehicle. In this unit, moreover, when the vehicle is in the stopping state, the supply of fuel to the engine is stopped to reduce the fuel consumption rate and accordingly the exhaust gas emission.

Incidentally, the drive unit stops the fuel supply to the engine when the vehicle stops to stop the rotation of the engine so that the accessories such as the air conditioner or the alternator connected to and driven by the engine cannot be operated. When the vehicle is to be restarted from the stopping state, the engine putters because it takes a considerable time for the engine to reach a predetermined idling rotation or a rotation matching the throttle opening after the engine is started.

In order to solve this problem, the prior art conceives a control method by which the fuel supply to the engine is exclusively cut while rotating the engine, even at a stop, at an RPM corresponding to the idling RPM of the motor generator (as will be herein called the "motoring"). If this control method is adopted, however, a pumping action of the engine is caused by the motoring so that the load upon the motor generator grows high during the stop. If the stopping time becomes long, the energy, as recovered by the regeneration, is greatly consumed so that a sufficient assist cannot be achieved for the starting or accelerating time. This, in turn, requires much fuel, thus dropping the power performance or deteriorating the mileage improving effect. Furthermore, if a short stop is frequently repeated, the fuel consumption at each restart of the engine deteriorates the mileage improving effect.

Moreover, the vehicle is usually equipped with a catalyst which is arranged in the exhaust system so as to purify the exhaust gas. The reaction promoting function of the catalyst drops if the catalyst is in a low temperature state. If, therefore, the aforementioned pumping of the engine continues for a long time, the catalyst temperature drops so that insufficiently purified exhaust gas is discharged at the engine restarting time.

SUMMARY OF THE INVENTION

It is, therefore, a first object of the invention to provide a control system for a vehicular drive unit, which is enabled to prevent the puttering in the change into a start and to drive the accessories by maintaining the idling rotation of an engine. Additionally, it is desirable to achieve the above object while also achieving a balance in the reduction of the mileage at a vehicle stopping time and the prevention of the deterioration of the exhaust gas due to a reduction in the power consumption and the drop of the catalyst temperature by reducing the fuel supply at the motoring time without any stop.

A second object of the invention is to properly detect the stopping state of the vehicle for control by the control system.

Incidentally, even when the power load is lightened by the motoring in which the fuel supply is reduced, as described above, the power consumption may become excessive when the stopping time of the vehicle is long. It is, therefore, a third object of the invention to prevent the excessive consumption of the electric power by changing the motoring control mode in accordance with the stopping time of the vehicle.

If this control is executed in a small storage state of the battery, even when the power load is lightened by the motoring in which the fuel supply is reduced, as described above, the electric storage of the battery may drop so low that the engine could not be restarted. It is, therefore, a fourth object of the invention to prevent the excessive consumption of the electric power by releasing the aforementioned control in accordance with the storage of the battery.

Some vehicles are equipped with a power steering unit which generally has a high power consumption. Moreover, the start, in the stopping state of the vehicle, is considered to be when the power steering unit consumes a lot of energy. It is, therefore, a fifth object of the invention to make the start smoother while preventing the excessive consumption of the electric power by releasing the aforementioned motoring control at the starting time of the power steering unit.

It is not preferable, in preventing the drop in the catalyst performance, to perform the aforementioned motoring control with the catalyst temperature being low. It is, therefore, a sixth object of the invention to maintain the catalyst function by releasing the aforementioned control in accordance with the catalyst temperature.

Incidentally, the rotary parts of the motor generator usually have a considerable inertial mass. As a result, if a control is made to switch the drive state of the motor generator quickly into the engine drive state, the inertial rotation of the motor generator is transmitted to the drive system in the stopping state by the application of the first clutch to cause serious shocks. It is, therefore, a seventh object of the invention to perform a control to prevent those serious shocks in advance of the restart preparation time.

In the system in which the shift mechanism is exemplified by an automatic transmission, there is provided a hydraulic power transmission which is equipped with a lockup clutch for the start and improvement in the mileage. It is, therefore, an eighth object of the invention to prevent any power loss when the engine is driven by the motor generator, by controlling the lockup clutch.

A ninth object of the invention is to speed up the restart from the motoring in a system equipped with the hydraulic power transmission having the lockup clutch.

Incidentally, some vehicular drive units, in which the engine and the motor generator are combined, have a structure which is equipped with a planetary gear as a split starting means. It is, therefore, a tenth object of the invention to apply the aforementioned motoring control to this type vehicle drive unit.

Moreover, an eleventh object of the invention is to detect the stopping state of the vehicle properly for the motoring control in the vehicular drive unit which is equipped with the planetary gear as the split starting means.

Moreover, a twelfth object of the invention is to prevent the excessive consumption of the electric power by changing the mode of the motoring control in accordance with the stopping time of the vehicle in the vehicular drive unit which is equipped with the planetary gear as the split starting means.

Moreover, a thirteenth object of the invention is to prevent the excessive consumption of the electric power by releasing the motoring control in accordance with the storage of the battery in the vehicular drive unit which is equipped with the planetary gear as the split starting means.

Moreover, a fourteenth object of the invention is to make the start smoother while preventing the excessive consumption of the electric power, by releasing the motoring control at the engagement time of the power steering unit in the vehicular drive unit which is equipped with the planetary gear as the split starting means.

Moreover, a fifteenth object of the invention is to maintain the catalyst function by releasing the motoring control in accordance with the catalyst temperature in the vehicular drive unit which is equipped with the planetary gear as the split starting means.

Moreover, a sixteenth object of the invention is to reliably maintain the stopping state of the vehicle while at a stopping time on a slope or when the depression of the vehicle brake is weakened, and also when at the motoring time in the vehicular drive unit which is equipped with the planetary gear as the split starting means.

Moreover, a seventeenth object of the invention is to accelerate the restart from the motoring in the vehicular drive unit which is equipped with the planetary gear as the split starting means.

Finally, an eighteenth object of the invention is to maintain the motor generator away from the load for holding the engine rotation at the aforementioned motoring time.

In order to achieve the above-specified first object, according to the invention, there is provided a control system for a vehicular drive unit comprising: an engine, a motor generator connecting to the output of the engine and acting as a power generator for recovering the energy from wheels and as a motor for driving the output shaft of the engine, a battery for storing the energy recovered by the motor generator as an electric power and for supplying electric power to drive the motor generator, a first clutch for connecting the motor generator and the wheels, stopping state detecting means for detecting a stopping state of the vehicle, and control means for controlling the engine, the motor generator and the first clutch, wherein when the stopping state is detected by the stopping state detecting means, the control means releases the first clutch, sets the supply of a fuel to the engine to a predetermined rate lower than that of an idling time/RPM, feeds an electric power to the motor generator to maintain the rotation of the engine substantially at an idling RPM by the drive of the motor generator.

In order to achieve the above-specified second object, moreover, the control system for a vehicular drive unit further comprises: a vehicle speed sensor for detecting a vehicle speed, a throttle sensor for detecting a throttle opening, and a brake sensor for detecting the applied state of a brake, wherein the stopping state detecting means detects the stopping state of the vehicle when the vehicle speed detected by the vehicle speed sensor is substantially at 0, when the throttle opening detected by the throttle sensor is in the fully closed state, and when the applied state detected by the brake sensor is determined.

In order to achieve the above-specified third object, the control means includes stopping time metering means for metering a stopping time of the vehicle and lowering the torque of the motor generator, when the stopping time is over a predetermined value, so that the rotation of the engine may be kept at a predetermined RPM smaller than the idling RPM.

In order to achieve the above-specified fourth object, the control system further comprises storage detecting means for detecting the electric storage of the battery, wherein when the stopping state of the vehicle is detected by the stopping state detecting means and when the battery storage detected by the storage detecting means is over a predetermined value, the control means releases the first clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified fifth object, moreover, when the stopping state of the vehicle is detected by the stopping state detecting means and when it is detected that the power steering switch is engaged, the control means releases the first clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified sixth object, the control system further comprises a catalyst temperature sensor for detecting the temperature of a catalyst, wherein when the stopping state of the vehicle is detected by the stopping state detecting means and when the catalyst temperature detected by the catalyst temperature sensor is over a predetermined value, the control means releases the first clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified seventh object, the control system further comprises a second clutch for connecting the engine and the motor generator, wherein when the output signal detected by the brake sensor is switched from ON to OFF with the motor generator being in the drive state, the control means returns the fuel supply to the engine to the rate of the idling time/RPM, stops the drive of the motor generator, releases the second clutch, brings the motor generator into the power generating state, and applies the first clutch.

In order to achieve the above-specified eighth object, the control system further comprises a hydraulic power transmission having a lockup clutch between the engine and the motor generator, wherein when the stopping state of the vehicle is detected by the stopping state detecting means, the control means releases the first clutch, applies the lockup clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified ninth object, when the output signal detected by the brake sensor is switched from ON to OFF with the motor generator being in the drive state, the control means returns the fuel supply to the engine to the rate of the idling time/RPM, stops the drive of the motor generator, releases the lockup clutch, brings the motor generator into the power generating state, and applies the first clutch.

In order to achieve the above-specified tenth object, there is provided a control system for a vehicular drive unit comprising: an engine, a motor generator connected to the output of the engine and acting as a power generator for recovering the energy from wheels and as a motor for driving the output shaft of the engine, a battery for storing the energy recovered by the motor generator as electric power and for supplying electric power to drive the motor generator, a planetary gear for connecting the engine, the motor generator and wheels in a drive manner, a direct clutch for connecting the planetary gear directly, stopping state detecting means for detecting a stopping state of the vehicle, and control means for controlling the engine, the motor generator and the direct clutch, wherein when the stopping state is detected by the stopping state detecting means, the control means releases the direct clutch, sets the supply of a fuel to the engine to a predetermined rate lower than that of an idling time/RPM, and feeds electric power to the motor generator to maintain the rotation of the engine substantially at an idling RPM by the reverse drive of the motor generator.

In order to achieve the above-specified eleventh object, the control system further comprises: a vehicle speed sensor for detecting a vehicle speed, a throttle sensor for detecting a throttle opening, and a brake sensor for detecting the applied state of a brake, wherein the stopping state detecting means detects the stopping state of the vehicle when the vehicle speed detected by the vehicle speed sensor is substantially at 0, when the throttle opening detected by the throttle sensor is in the fully closed state, and when the brake sensor detects the applied state of the brake.

In order to achieve the above-specified twelfth object, the control means includes stopping time metering means for metering a stopping time of the vehicle. Additionally, the control means lowers the torque of the motor generator, when the stopping time is over a predetermined value, so that the rotation of the engine may be kept at a predetermined RPM smaller than the idling RPM.

In order to achieve the above-specified thirteenth object, the control system further comprises storage detecting means for detecting the electric storage of the battery, wherein when the stopping state of the vehicle is detected by the stopping state detecting means and when the battery storage detected by the storage detecting means is over a predetermined value, the control means releases the direct clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified fourteenth object, the control system further comprises a power steering switch for detecting the engagement of a power steering, wherein when the stopping state of the vehicle is detected by the stopping state detecting means and when it is detected by the power steering switch that the power steering is active, the control means releases the direct clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified fifteenth object, the control system further comprises a catalyst temperature sensor for detecting the temperature of a catalyst, wherein when the stopping state of the vehicle is detected by the stopping state detecting means and when the catalyst temperature detected by the catalyst temperature sensor is over a predetermined value, the control means releases the direct clutch, sets the fuel supply to the engine to the predetermined rate lower than that of the idling time/RPM, and feeds electric power to the motor generator to bring it into the drive state to thereby maintain the rotation of the engine substantially at the idling RPM.

In order to achieve the above-specified sixteenth object, the control system further comprises an automatic transmission between the planetary gear and the wheels, wherein the control means includes shift control means for shift-control of the automatic transmission, and wherein when the stopping state is detected by the stopping state detecting means, the control means shifts the gear stages of the automatic transmission to one for preventing the reverse rotation and then releases the direct clutch, sets the fuel supply to the engine to the predetermined rate lower than that of an idling time/RPM, and feeds the electric power to the motor generator to maintain the rotation of the engine substantially at the idling RPM by the reverse drive of the motor generator.

In order to achieve the above-specified seventeenth object, when the output signal detected by the brake sensor is switched from ON to OFF with the motor generator being in the drive state, the control means returns the fuel supply to the engine to the rate of the idling time/RPM.

In order to achieve the above-specified eighteenth object, the predetermined rate lower than that of the idling time/RPM is set to at least a value for the engine itself to maintain its rotation.

BRIEF DESCRIPTION OF THE DRAWINGS

The invention will be described with reference to the drawings in which:

FIG. 10 is an application diagram of an automatic transmission in a power train of the FIG. 9 embodiment;

FIG. 13 is an application diagram of an automatic transmission in the power train of the modification.

DESCRIPTION OF THE PREFERRED EMBODIMENTS

Figure 1:
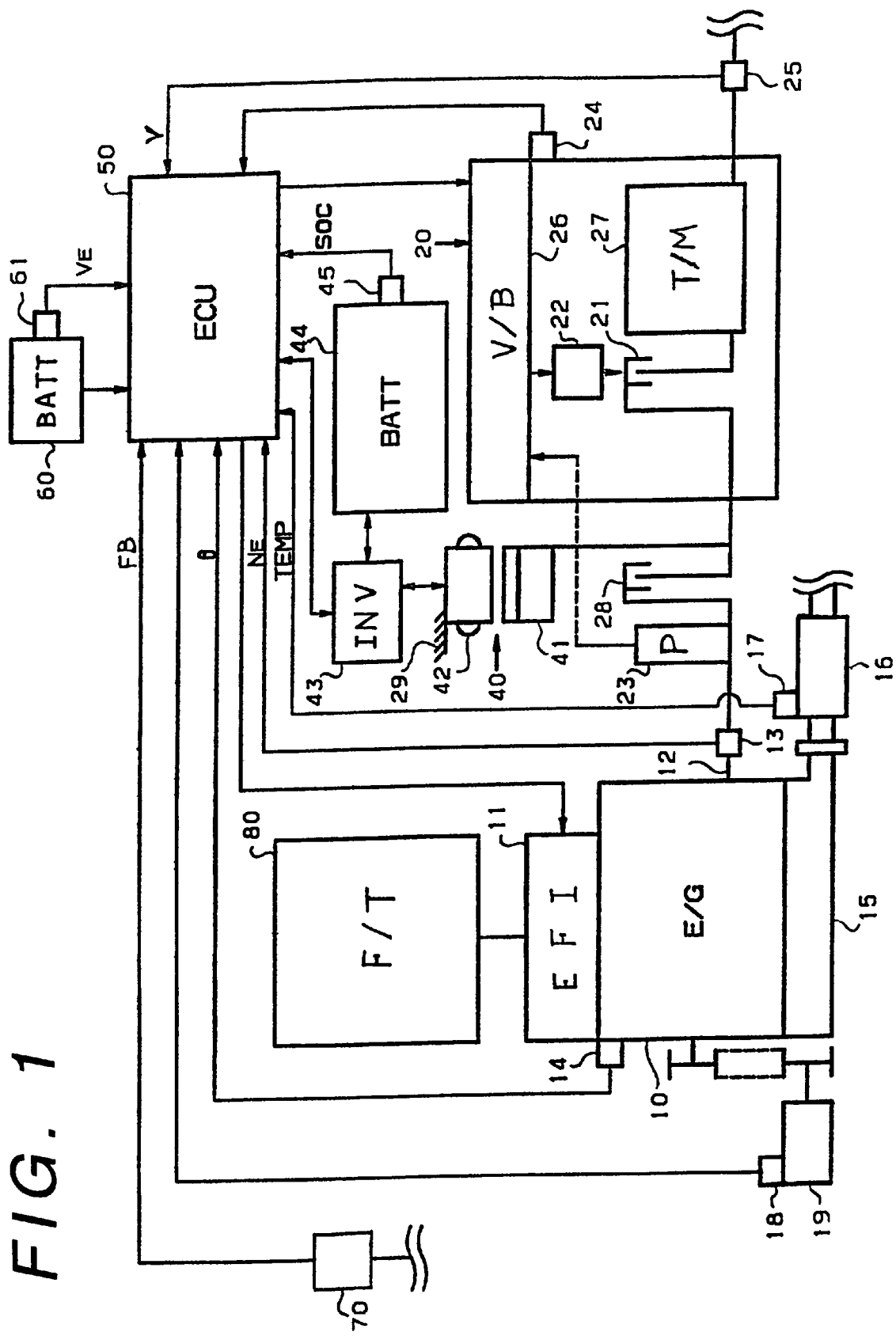
FIG. 1 is a block diagram schematically showing a structure of a vehicular drive unit according to a first embodiment of the invention.

The invention will be hereafter described in connection with its embodiments with reference to the accompanying drawings. The vehicular drive unit is structured, as schematically shown in its entirety in FIG. 1, to include: an engine (E/G) 10; a motor generator 40 connected to the output shaft 12 of the engine 10 and acting as a generator for recovering the energy of the not-shown wheels and as a motor for driving the output shaft 12 of the engine 10; a battery (BATT) 44 for storing as an electric power the energy recovered by the motor generator 40 and for supplying electric power to drive the motor generator 40; a first clutch 21 for connecting the motor generator 40 and the wheels; stopping state detecting means for detecting the stopping state of the vehicle; and control means (ECU) 50 for controlling the engine 10, the motor generator 40 and the first clutch 21.

The control means 50 performs, when a stopping condition is detected by the stopping state detecting means, a motoring control to release the first clutch 21, to set the supply of the fuel to the engine 10 to a lower predetermined amount than that of the idling time/RPM, and to supply electric power to the motor generator 40 to thereby maintain the engine substantially at an idling RPM.

The vehicular drive unit is equipped with a vehicle speed sensor 25 for detecting a vehicle speed (V), a throttle sensor 14 for detecting a throttle opening (θ), and a brake sensor 70 for detecting a brake applied state (FB), which are used as the detection units of the stopping state detecting means. This stopping state detecting means detects a stopping state of the vehicle when the vehicle speed (V) detected by the vehicle speed sensor 25 is substantially 0, when the throttle opening (θ) detected by the throttle sensor 14 is in the fully closed state, and when the applied state of the brake is detected, i.e., the depression (FB) detected by the brake sensor 70 indicates brake ON.

The control means 50 is equipped with stopping time metering means for metering the stopping time of the vehicle. If the stopping time exceeds a predetermined value, the control means 50 performs a control to maintain the rotation of the engine 10 at a predetermined RPM lower than the idling RPM. This control will be called the "drooping control".

This drive unit is further equipped with storage detecting means 45 for detecting the electric storage of a battery (BATT) 44 (referred to as the "storage" hereafter). The control means 50 performs, when the stopping state of the vehicle is detected by the stopping state detecting means and when the battery storage detected by the storage detecting means 45 exceeds the predetermined value, the motoring control to release the first clutch 21, to set the supply of the fuel to the engine 10 to the lower predetermined value than that of the idling time or idling RPM, and to supply the electric power to the motor generator 40 to thereby bring it into the drive state to maintain the engine substantially at the idling RPM.

On the other hand, this drive unit is equipped with a power steering switch 18 for detecting the active engagement of the not-shown power steering. The control means 50 performs, when the stopping state of the vehicle is detected by the stopping state detecting means and when it is detected by the power steering switch 18 that the power steering is inactive, the motoring control to release the first clutch 21, to set the supply of the fuel to the engine 10 to the lower predetermined value than that of the idling time/RPM, and to supply electric power to the motor generator 40 to thereby bring it into the drive state to maintain the engine substantially at the idling RPM.

Moreover, this drive unit is equipped with a catalyst temperature sensor 17 for detecting a catalyst temperature. The control means 50 performs, when the stopping state of the vehicle is detected by the stopping state detecting means and when the catalyst temperature (TEMP) detected by the catalyst sensor 17 exceeds a predetermined value, the motoring control to release the first clutch 21, to set the supply of the fuel to the engine 10 to the lower predetermined value than that of the idling time/RPM, and to supply electric power to the motor generator 40 to thereby bring it into the drive state to maintain the engine substantially at the idling RPM.

In this embodiment, the vehicle drive unit further includes a second clutch 28 for connecting the engine 10 and the motor generator 40. If the output signal detected by the brake sensor 70 is turned OFF from ON while the motor generator 40 is being driven, the control means 50 performs a control to return the supply of the fuel to the engine 10 to that of the idling time/RPM, to stop the drive of the motor generator 40, to release the second clutch 28, to bring the motor generator 40 into a generating state and to apply the first clutch 21.

Here will be described the detailed structure of the individual portions. The engine 10 is equipped with a fuel supply unit (EFI) 11, an exhaust manifold 15 and a catalyst 16 in the exhaust system leading from the exhaust manifold 15. The fuel supply unit 11 is connected to a fuel tank (F/T) 80 so that the supply of the fuel from the fuel tank 80 to the engine 10 is controlled by a signal coming from the control means 50 made of a control computer. In the engine 10, there is arranged the throttle opening sensor 14 which is so connected with the control means 50 that its signal can be outputted. The catalyst temperature sensor 17 is arranged in connection with the catalyst 16 and is so connected with the control means 50 that its signal can be outputted. A pump 19 of the power steering is connected to the engine 10 through a transmission mechanism, and the power steering switch 18, as made of a pressure switch, is arranged in connection with the pump 19 and is also so connected with the control means 50 that its signal can be outputted. An engine RPM sensor 13 is arranged in connection with the output shaft 12 of the engine 10 and is likewise so connected with the control means 50 that its signal can be outputted.

An oil pump (P) 23, providing an oil pressure source for a shift unit 20, is arranged in connection with the output shaft 12 of the engine 10 and is connected via an oil passage with a hydraulic control unit (V/B) 26. A transmission mechanism 27 of the shift unit 20 is connected through the first clutch 21 to the input shaft of the shift unit 20, and this input shaft is connected in this embodiment through the second clutch 28 to the output shaft 12 of the engine 10. In connection with this, there is arranged in the first clutch 21 a hydraulic servo 22 for applying/releasing the first clutch 21, and this hydraulic servo 22 is connected via an oil passage to the hydraulic control unit 26 so that oil pressure can be supplied. The second clutch 28 is shown as one similar to the first clutch 21 in this embodiment, and its hydraulic servo is not shown so as to avoid complexity. However, this clutch can be modified by the use of a lockup clutch which is arranged in a hydraulic power transmission made of a torque converter.

The motor generator 40 is constructed of a stator 42 fixed on a transmission case 29, and a rotor 41 made rotatable in the stator 42. The rotor 41 is connected to the input shaft of the shift unit 20. The battery 44, constituting the power source of the motor generator 40, is disposed separately of a 12 V battery (BATT) 60, which constitutes the power source of the control means 50, and is exemplified by a battery at a voltage as high as 240 V for enabling the motor generator 40 to start the vehicle. The battery 44 and the motor generator 40 are connected with each other through a power control unit (INV) 43 which is controlled by transferring a signal to and from the control means 50. The storage detecting means 45 is arranged in connection with the battery 44 and is so connected with the control means 50 that its signal can be outputted.

Incidentally, reference numeral 24 designates a shift position sensor which is exemplified by a neutral start switch for detecting the selected position of the shift unit 20, and the numeral 25 designates the vehicle speed sensor for detecting the rotation of the output shaft of the shift unit 20. These sensors are also so connected with the control means 50 so that their signals can be outputted. Moreover, the hydraulic control unit 26 is so connected with the control means 50 that a control signal may be inputted to the solenoid arranged therein.

Figure 2:
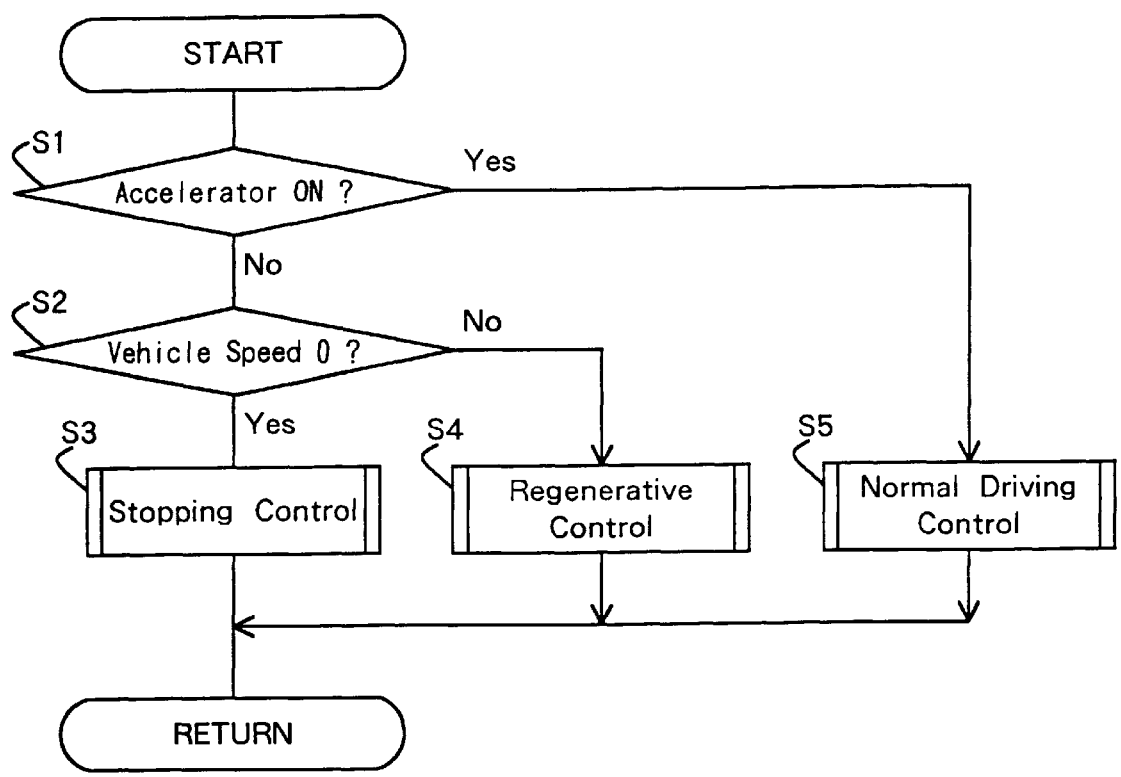
FIG. 2 is a flow chart showing a main routine of a control process of a control system of the aforementioned embodiment.

Next, the controls of the unit thus structured will be described with reference to the flow charts of FIGS. 2 to 5. FIG. 2 shows a main routine of the vehicle control. This main routine is started by Step S1 at which the drive intention of the driver is decided depending upon whether the accelerator or the throttle is ON. At next Step S2, the vehicle drive state is determined in terms of whether the vehicle speed V=0. If this answer is YES (Y) indicating the vehicle stopping state, the routine enters the stopping control subroutine of Step S3 according to the scope of the invention. If the decision of Step S2 is NO (N) indicating the vehicle coasting, on the other hand, the routine enters the regenerative control subroutine of Step S4 for achieving the engine braking effect. On the other hand, if the decision of Step S1 is that the accelerator is ON, indicating the drive intention, the routine enters the normal drive control subroutine of Step S5.

For the normal driving control for Step S5, it is arbitrarily possible to adopt one similar to the control of the general automatic transmission or a variety of other control modes. Since these are apart from the scope of the invention, their description will be omitted to avoid redundancy, and the stopping control and the regenerative control will be described in the following.

Figure 3:
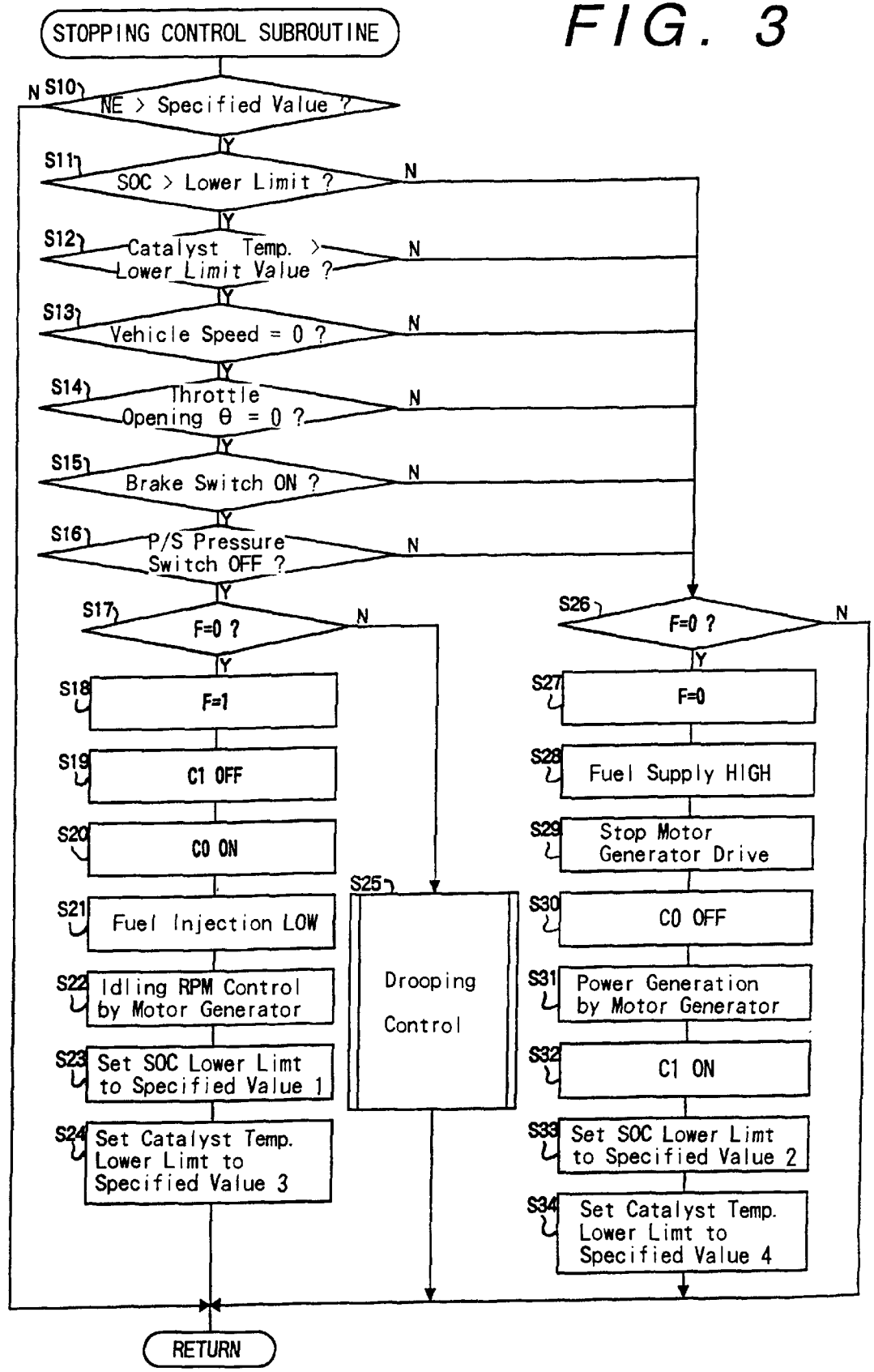
FIG. 3 is a flow chart showing a stopping control subroutine in the main routine.

FIG. 3 shows the stopping control subroutine. At first Step S10, it is determined whether an engine RPM (NE) is over a specified value. If the determination is YES, the subroutine determines: at Step S11 whether the battery storage (SOC) is over a specified value; at Step S12 whether the catalyst temperature is over a lower limit; at Step S13 whether the vehicle speed (V) is at 0; at Step S14 whether the throttle opening (θ) is at 0 (or in the fully closed state); at Step S15, by a brake sensor, whether the brake pedal is depressed (or ON); and at Step S16 whether the power steering switch (P/S) is OFF (if steering wheel is being handled, the switch is ON).

At Step S17, a flag F indicating the execution of the present stopping control is determined. At first, the flag F=0. The flag is set to F=1 at Step S18 to start the stopping control. At Step S19, the first clutch (C1) 21 is released (OFF). At Step S20, the second clutch (C0) is applied (ON). At next Step S21, the fuel injection according to the scope of the invention is lowered.

Here will be described this fuel injection. In the idling state of the engine, generally speaking, the torque is outputted to maintain the engine RPM stable while driving the accessories connected to the engine. The engine RPM is set at about 650 RPM according to the ordinary examples. This value estimates a considerable allowance, as viewed from the RPM necessary for maintaining the running engine by overcoming the load at the compression stroke of the engine itself. As a result, the fuel supply in this state is far more than that necessary for maintaining the rotation. In the present embodiment, therefore, the fuel supply is reduced to such a rate for the output torque 0 (usually for the rotation of about 200 RPM) as can maintain the rotation of the engine itself, and the deficient torque is supplemented by the drive of the motor generator so that the engine RPM may be increased to the ordinary idling RPM thus, allowing the accessories to work. By adopting this method, the present embodiment can lighten the power load drastically in the motoring operation.

Reverting to the flow of FIG. 3, at Step S22, the power is supplied to the motor generator 40 from the battery 44 so that the motor generator 40 is brought into the drive state to drive the engine (E/G) 10 substantially at the idling RPM (for the motoring). At Step S23, the lower limit of the storage (SOC) of the battery 44 is set to a specified value 1. At Step S24, the lower limit of the catalyst temperature is set to a specified value 3. Thus, the motoring control is entered, and, if the flag decision of Step S17 in the subsequent routine is F=1, the later-described drooping subroutine is entered at Step S25.

If any answer of Step S11 to Step S16 is NO (N), it is determined at Step S26 whether the flag F=0. At Step S27, the flag F is set to F=0 (to inhibit the motoring control). At Step S28, the fuel supply to the engine 10 is set to a normal one for idling. At Step S29, the power supply to the motor generator 40 is stopped. At Step S30, the second clutch (C0) 28 is released (OFF). At Step S31, the motor generator 40 is brought into the power generation state to absorb the inertia of the rotor 41. At Step S32, after the rotor 41 is stopped, the first clutch (C1) 21 is applied (ON). At Step S33, the lower limit of the storage (SOC) of the battery 44 is set to a specified value 2. At Step S34, the lower limit of the catalyst temperature (TEMP) is set to a specified value 4.

Figure 4:
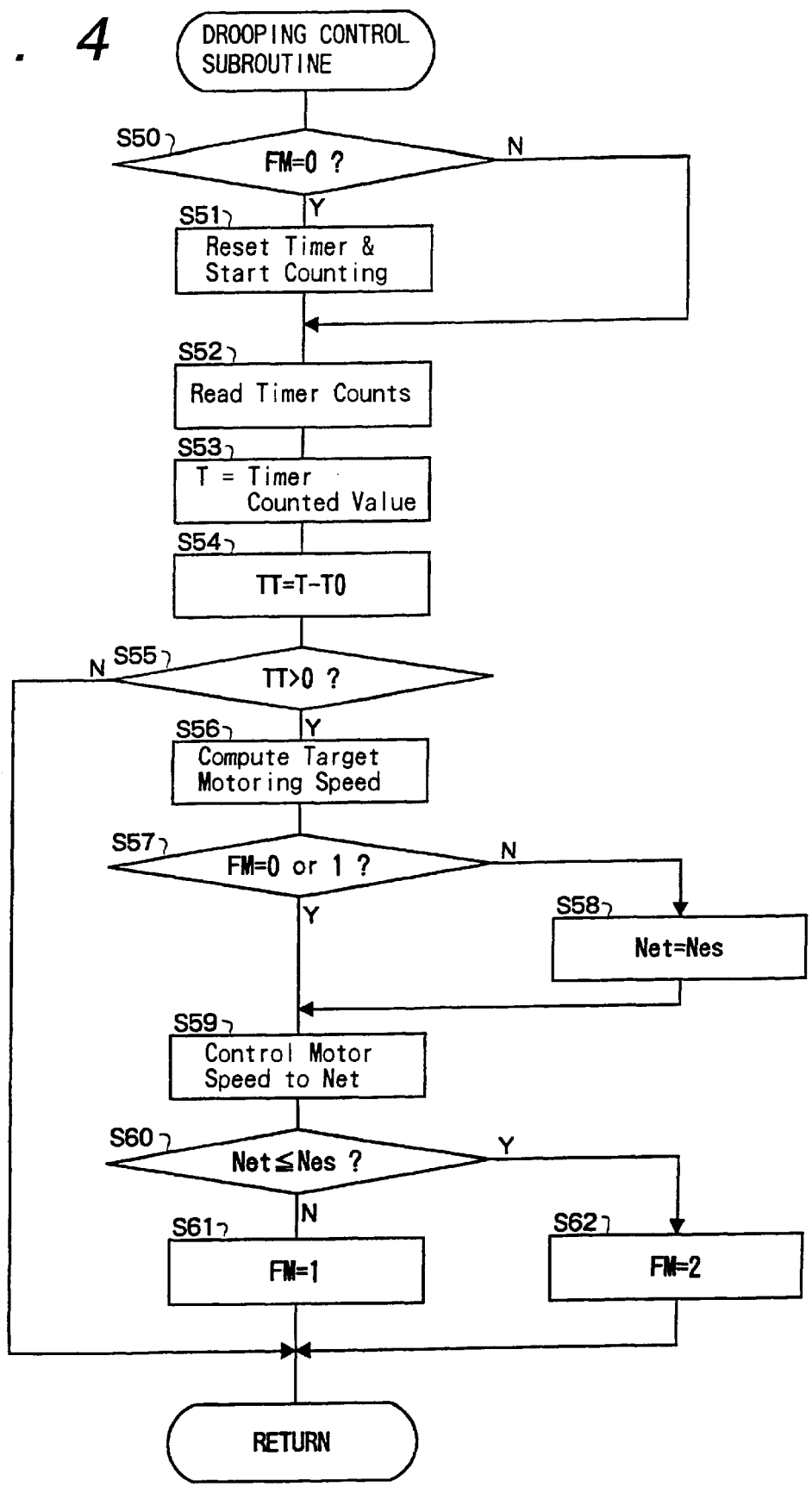
FIG. 4 is a flow chart showing a drooping control subroutine in the main routine.

In the drooping control subroutine shown in FIG. 4, at Step S50, it is determined whether a flag FM is at 0, indicating the drooping control is not being executed (FM=1 indicates that the control is being executed and FM=2 indicates engine RPM being at its lowermost limit). Next, at Step S51, the timer for metering the stopping time of the vehicle is reset to start the counting. At Step S52, the count of the timer is read. At Step S53, the counted value of the timer T is inputted. At Step S54, TT=T−T0 is computed (wherein T0 designates a set value for deciding whether the stop time is long). At Step S55, it is decided whether the TT, of Step S54, is positive. If this determination is YES (Y), it is decided that the stopping time is long and Step S56 is executed. If NO (N), the stopping time is short, and the drooping control is not executed, but the engine 10 is kept substantially at the idling RPM. At Step S56, the target speed (Net) of the motor generator 40 is computed to drop the RPM of the engine. The formula for this computation is Net=Nei−T Neo (wherein Nei and Neo are constants). At Step S57, moreover, it is determined whether the flag FM is at 0 or 1, as opposed to being at 2 (see Step S62).

If the decision of Step S57 is NO (N), the target speed (Net) of the motor generator 40 is set to the lower limit (Nes) (e.g., about 500 RPM which is determined as being above the engine stall by the control computer (ECU) 50). At Step S59, the speed of the motor generator 40 is set to the target speed (Net). At Step S60, it is determined whether the target speed (Net) is below the target value (Nes). If the determination of Step S60 is NO (N), the flag FM is set at Step S61 to 1 (wherein FM=1 implies that the engine RPM is still over the lower limit so that the drooping control can be further performed). If the decision of Step S60 is YES (Y), on the other hand, the flag FM is set at Step S62 to 2 (wherein FM=2 implies that the engine RPM reaches the lower limit so that it cannot be lowered anymore, and is kept at the lower limit). Here, the predetermined RPM is the combination of the RPM, at which the control computer (ECU) 50 decides that the engine 10 is stalling, and an allowance RPM.

Reverting to FIG. 2, the regenerative control of Step S4 will be briefly described because it has only indirect relation to the scope of the invention. It is determined by the brake sensor 70 whether the brake is depressed. If this brake is not depressed, the energy corresponding to the engine brake is regenerated. If the brake is depressed, on the other hand, the energy corresponding to the brake depression is regenerated. Specifically, if the brake is not depressed, the regenerative current is computed from the regenerative torque and the vehicle speed (V), and the motor generator 40 is caused to generate the power so as to charge the regenerative current. If the brake is depressed, on the other hand, the speed of the motor generator 40 is computed. Then, the regenerative current is computed from the gear ratio, the speed of the motor generator 40 and the depression (FB) of the brake. Then, the second clutch 28 is released. Finally, the motor generator 40 is caused to generate the power so as to charge the regenerative current.

Figure 5:
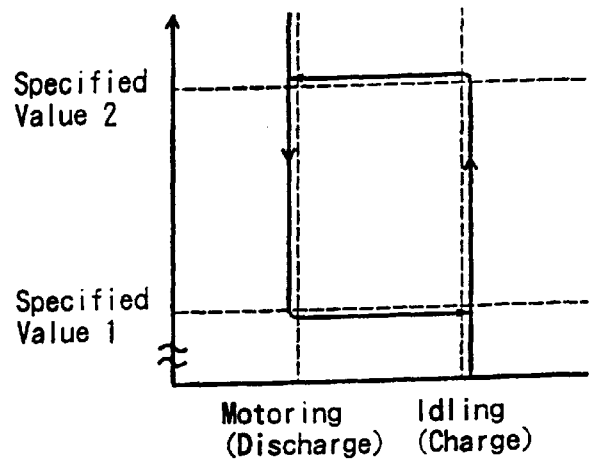
FIG. 5 is an explanatory diagram illustrating one example of a method of setting the lower limit of a battery storage in the aforementioned embodiment.

A method for setting two specified values (SOC1 and SOC2) relating to the lower limit of the storage (SOC) of the battery under the aforementioned control will now be described. These values are specified in percentages of the complete charge (as measured as the time product of the current flow in the present embodiment), and account for the hysteresis effect, as illustrated in FIG. 5. In the case of discharge by motoring, more specifically, when the storage (SOC) drops to the specified value 1 (SOC 1), it is accepted as the lower limit to stop the discharge (or to release the control). As a result, the operation is changed into the engine running state so that the charge is started by the idling. When, moreover, the storage is caused to reach the specified value 2 (SOC 2) by the charge of a predetermined time, the discharge by the motoring is started again. Thus, the hunting of the motoring control is prevented by setting the hysteresis in the specified values.

Figure 6:
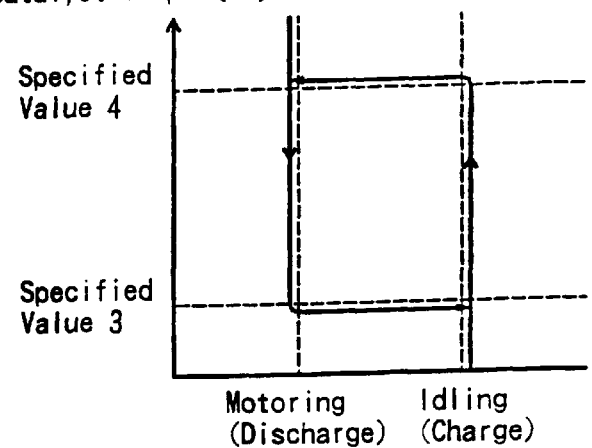
FIG. 6 is an explanatory diagram illustrating one example of a method of setting the lower limit of a catalyst temperature in the aforementioned embodiment.

For similar reasons, the two specified values (i.e., specified value 3 and specified value 4) are set for the lower limit of the catalyst temperature. In this case, too, the hysteresis effects are also accounted for, as illustrated in FIG. 6. Specifically, the catalyst temperature goes down during the motoring, and this motoring is stopped (or released from the control) when the catalyst temperature reaches the specified value 3, i.e., the lower limit. As a result, the operation is switched to the engine running state to start the idling. When the catalyst temperature rises with the lapse of time till it reaches the specified value 4, the motoring is started again. By thus setting the specified values with the hysteresis, the hunting of the motoring control is prevented.

Figure 7:
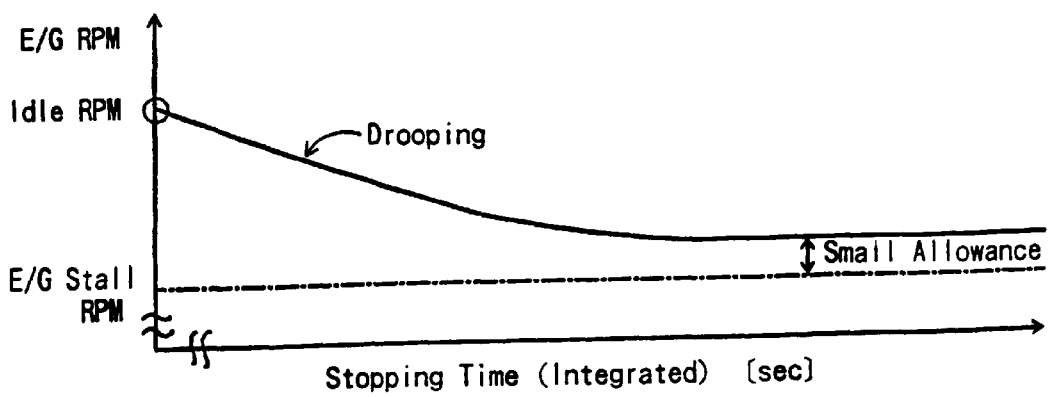
FIG. 7 is an explanatory diagram illustrating the detail of a drooping control in the aforementioned embodiment.

Here will be described the drooping control of the aforementioned controls. FIG. 7 plots the engine (E/G) RPM against the stopping time. In this control, the idling RPM is monitored for the motoring control period during the vehicle stop and is lowered as the integrated stopping time grows long, until it is lowered to a predetermined RPM given a small allowance for the engine stall RPM (which is determined as the stall RPM by the control computer 50). As a result, the motoring can be performed while suppressing the power consumption if the stopping time is long, and can smooth the restart of the engine if the stopping time is short.

FIG. 8 is a block diagram schematically showing other embodiments of the vehicle drive unit according to the invention, in contrast with the foregoing first embodiment. FIG. 8(A) shows the arrangement of the first embodiment, in which the first clutch (C1) 21 is interposed between the motor generator (M/G) 40 and the transmission mechanism (T/M) 27 and in which the second clutch (C0) 28 is interposed between the motor generator (M/G) 40 and the engine (E/G) 10.

Figure 8A:
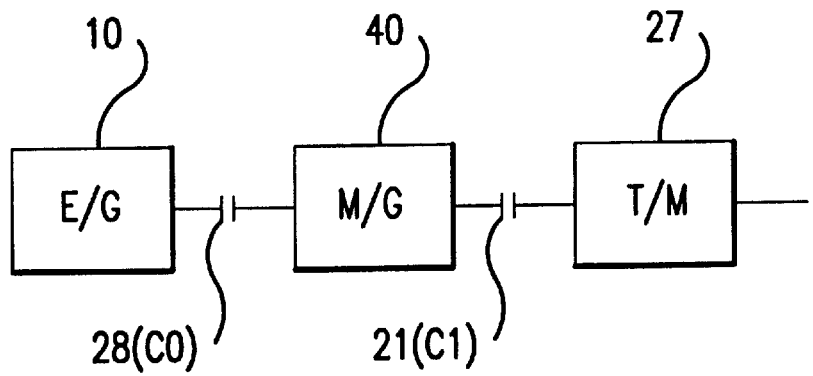
FIGS. 8 (A)–(D) are block diagrams schematically showing constructions of the vehicular drive unit according to another embodiment of the invention.
Figure 8B:
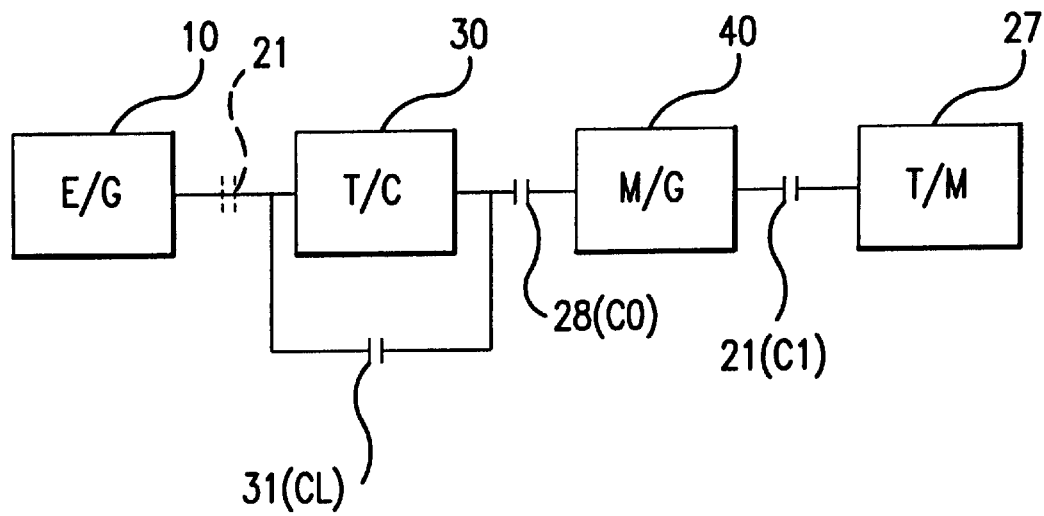

On the other hand, the second embodiment shown in FIG. 8(B) is similar to the first embodiment in that the first clutch (C1) 21 is interposed between the motor generator (M/G) 40 and the transmission mechanism (T/M) 27 but is different in that a hydraulic power transmission (T/C) 30 having a lockup clutch (CL) 31 is interposed between the engine (E/G) 10 and the motor generator (M/G) 40. In the case of this arrangement, the control means performs, when the stop state is detected by the stopping state detecting means, the motoring control to release the first clutch 21 but apply the lockup clutch 31, to lower the supply of the fuel to the engine 10, and to supply electric power to the motor generator 40 to thereby bring it into the drive state and to maintain the engine substantially at the idling RPM. What is specifically different from the first embodiment resides in that, at Step S20 in the stopping control subroutine (as shown in FIG. 3) of the first embodiment, not only the second clutch (C0) but also the lockup clutch 31 is applied to prevent the drive loss due to the slippage of the fluid in the torque converter 30. Additionally, in Step S30, not only the second clutch (C0) 28 but also the lockup clutch 31 is released. Thus, the details of the individual controls by the present embodiment will be omitted by reading the foregoing steps of the description of the foregoing embodiment. Incidentally, in the present embodiment, the positional relationship between the second clutch 28 and the torque converter 30 having the lockup clutch 31 may be reversed from the shown arrangement.

With the controls thus far described with such system, when the output signal detected by the brake sensor 70 is switched from ON to OFF with the motor generator 40 being driven, the control means 50 performs the control to return the fuel supply to the engine to the normal value, to stop the drive of the motor generator 40, to release the lockup clutch (CL) 31, to bring the motor generator 40 into the power generating state and to apply the first clutch (C1) 21 (refer to Steps S28 to S32 of the motoring control subroutine shown in FIG. 3).

Figure 8C:
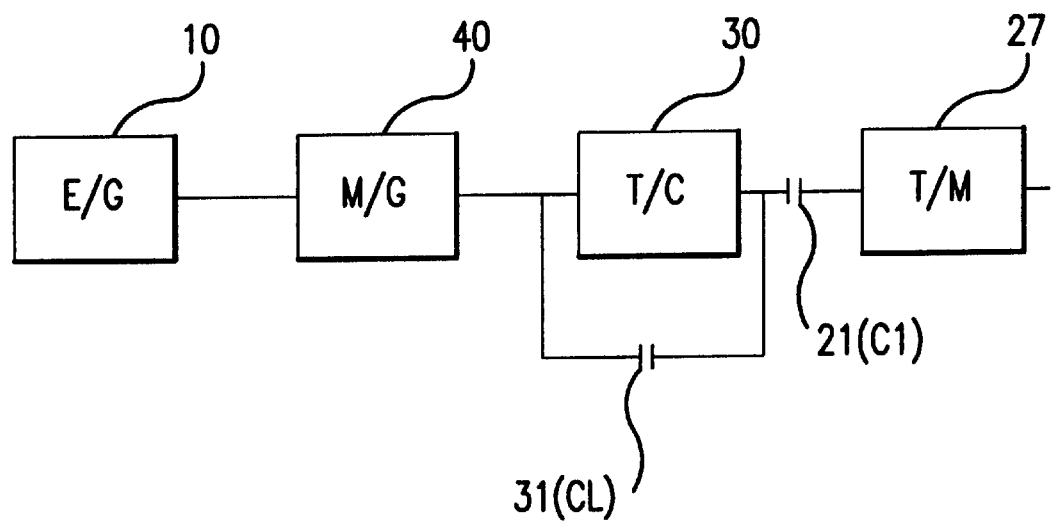

In a third embodiment shown in FIG. 8(C), the engine (E/G) 10 and the motor generator (M/G) 40 are directly connected to each other, and the torque converter (T/C) 30 and the first clutch (C1) 21 are arranged in series between the motor generator 40 and the transmission mechanism (T/M) 27. This arrangement thus adopted can perform controls similar to those of the first embodiment. However, Step S20 is eliminated from the stopping control subroutine. At Step S30, the lockup clutch (CL) 31 is released in place of the second clutch (C0) 28. At Step S32, the first clutch (C1) 21 is applied in the rotation state of the rotor 41, as decelerated at the preceding Step S31. As to the remaining process, the description of the first embodiment can substitute that of the control of the present embodiment.

Figure 8D:
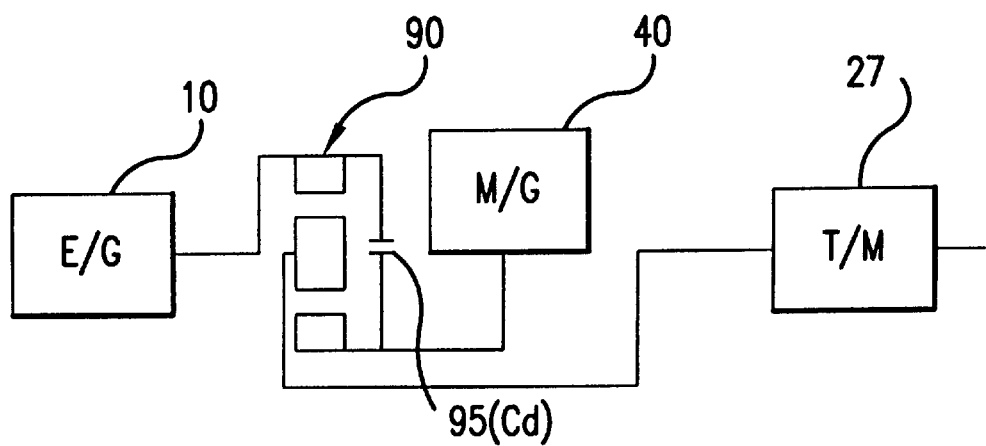

Finally, FIG. 8(D) shows a fourth embodiment, which is equipped with a planetary gear 90 as a split starting means for connecting the engine 10, the motor generator 40 and the automatic transmission 27 connected to the wheels. Moreover, the planetary gear 90 is enabled to effect the direct connection of the planetary rotation by applying/releasing a direct clutch 95. In this case, the control means performs, when the stopping condition is detected by the stopping condition detecting means, the motoring control to release the direct clutch 95, to set the supply of the fuel to the engine 10 to a lower predetermined amount than that of the idling time/RPM, and to supply electric power to the motor generator 40 to thereby maintain the engine substantially at the idling RPM by the reverse drive of the motor generator 40.

In this embodiment, the automatic transmission 27 is arranged between the planetary gear 90 and the wheels, and the control means is equipped with speed change control means for controlling the speed change of the automatic transmission 27. This control means performs, when the stopping condition is detected by the stopping condition detecting means, the motoring control to shift the gear stage of the automatic transmission 27 into one preventing the reverse rotation, then to release the direct clutch 95, to set the supply of the fuel to the engine 10 to a lower predetermined amount than that of the idling time/RPM, and to supply the electric power to the motor generator 40 to thereby maintain the engine substantially at the idling RPM by the reverse drive of the motor generator 40. When the output signal detected by the brake sensor 80 is switched from ON to OFF with the motor generator 40 being in the drive state, the control means performs the control to return the supply to the engine 10 to that of the idling time.

Figure 9:
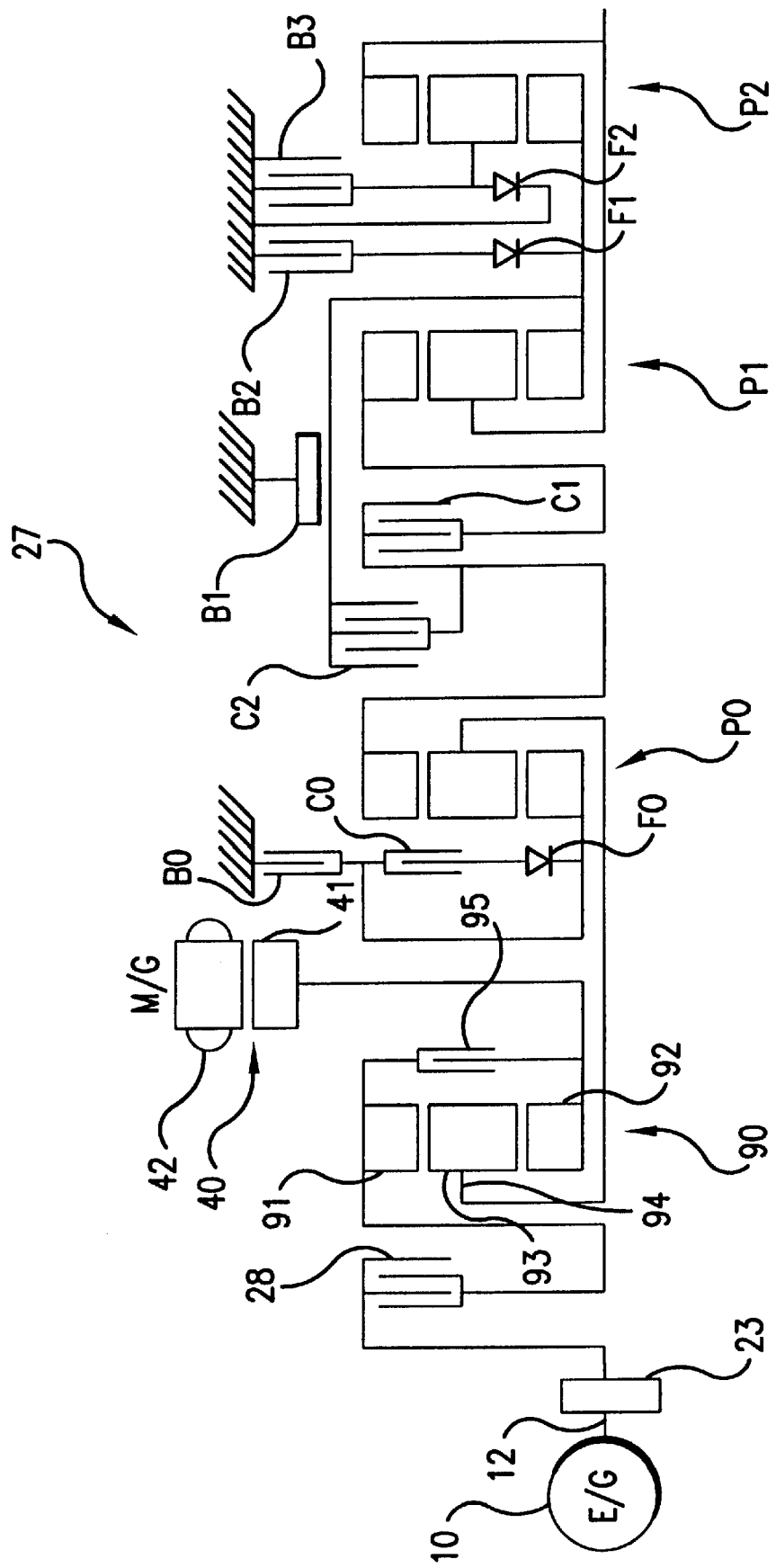
FIG. 9 is a skeleton diagram showing a power train of a vehicular drive unit according to another embodiment of the invention.

FIG. 9 shows the power train of the present embodiment in detail. The planetary gear 90 is constructed to include a ring gear 91, a sun gear 92, a pinion gear 93 meshing with the two gears 91 and 92, and a carrier 94 supporting the pinion gear 93. The ring gear 91 is connected through the start clutch 28 to the output shaft 12 of the engine 10. The sun gear 92 is connected to the rotor 41 of the motor generator 40. The carrier 94 is connected to the input shaft of the automatic transmission 27.

The automatic transmission 27 is structured into one having four speeds by combining a planetary gear (P0) making an overdrive mechanism with a transmission mechanism having three forward and one reverse gear stages and including two planetary gears (P1 and P2) as speed change elements. The carrier and the sun gear of the planetary gear (P0), as connected to the input shaft, are connected through a clutch ($C_0$) and a one-way clutch (F0) in parallel, and the sun gear can be stopped by a brake B0. The ring gear, as making the output element of the planetary gear (P0), is connected through clutches $C_1$ and $C_2$ to the ring gear and the sun gear of the planetary gear (P1). The sun gear and the ring gear of the planetary gear (P2) are connected to the sun gear and the carrier of the planetary gear (P1), respectively, and the ring gear acts as the output element of the automatic transmission. Moreover, the two sun gears can be stopped by a brake B1, and the one-way clutch F1 and a brake B2 in parallel, and the carrier of the planetary gear (P2) can be stopped by the one-way clutch F2 and the brake B3 in parallel.

The automatic transmission is operated by applying or releasing the individual engagement elements according to the selected individual range positions, i.e., "P", "N", "R" and "D", such as the clutches $C_0$ to $C_2$, the brakes B0 to B3 and the one-way clutches F0 to F2. In FIG. 10: symbols O indicate the applied states of the individual clutches and brakes and the locked states of the one-way clutches; and symbols x indicate the released states of the individual clutches and brakes and the idle rotations of the one-way clutches. Incidentally, although the "2nd" range is not separately tabulated, the 2nd speed and the 1st speed are within this range, as are the applications of the brakes indicated by parenthesized (O), so that the engine braking operation is achieved.

In this automatic transmission, at the 3rd and 4th speeds of the "D" range, the clutch $C_1$ and the clutch $C_2$ are applied to connect the planetary gear (P1) directly and the planetary gear (P2) directly, so that the one-way clutch F1 is locked with the application of the brake B2 by the reverse rotation of the output shaft. As a result, the gear stages to be prevented from the reverse rotation by the automatic transmission 27 in the motoring control in the present embodiment are the aforementioned 3rd and 4th speeds.

Figure 11:
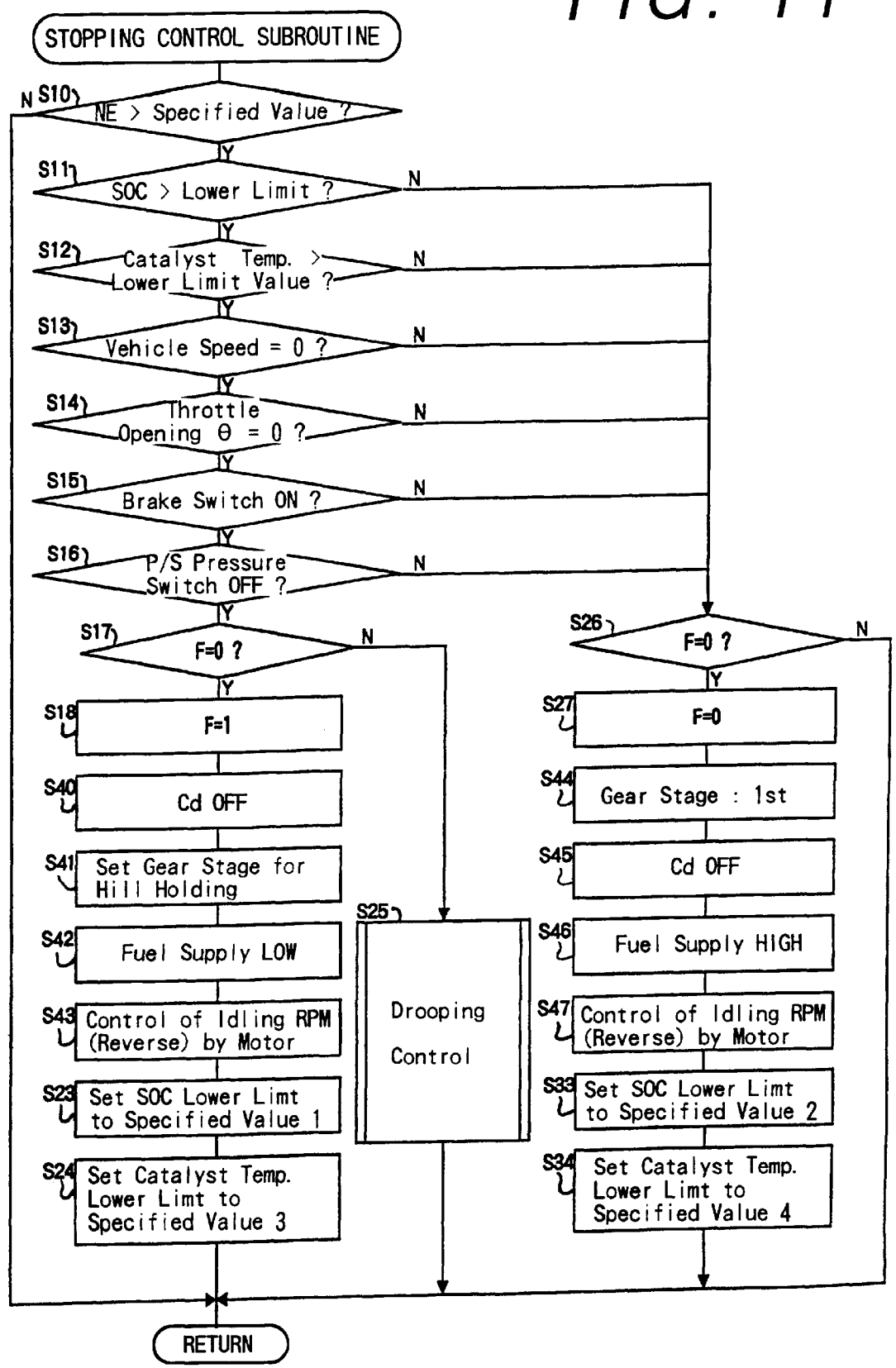
FIG. 11 is a flow chart showing a stopping control subroutine of the control system of the FIG. 9 embodiment.

FIG. 11 shows a stopping control subroutine of the present embodiment. In this control process, what is different from the process of the aforementioned first embodiment is the operations of Steps S40 to S43 and Steps S44 to S47. The differences will be exclusively described in the following. Specifically, at Step S40, a direct clutch (Cd) 95 is released. At Step S41, the speed change for setting a slope hold gear stage, i.e., the 3rd or 4th speed gear stage, is performed by a shift means. The operations similar to those of Steps S21 and S22 are executed at subsequent Steps S42 and S43, but the rotation of the motor generator at Step S43 is reversed.

In the motoring control releasing routine, on the other hand, the setting of the gear stage to the 1st speed is executed at Step S44 prior to the release (OFF) of the direct clutch (Cd) 95 at Step S45. The operation of Step S46 is similar to that of Step S28, and the operation of Step S47 is similar to that of Step S43 of the routine at the motoring control executing side. Incidentally, in the case of this power train, the two input clutches $C_1$ and $C_2$ of the transmission are released in the "P" range or "N" range so that the motor generator 40 may be modified to rotate forward into the motoring state by applying the direct clutch 95 of the split starting means in place of Steps S40, S41 and S43.

Figure 12:
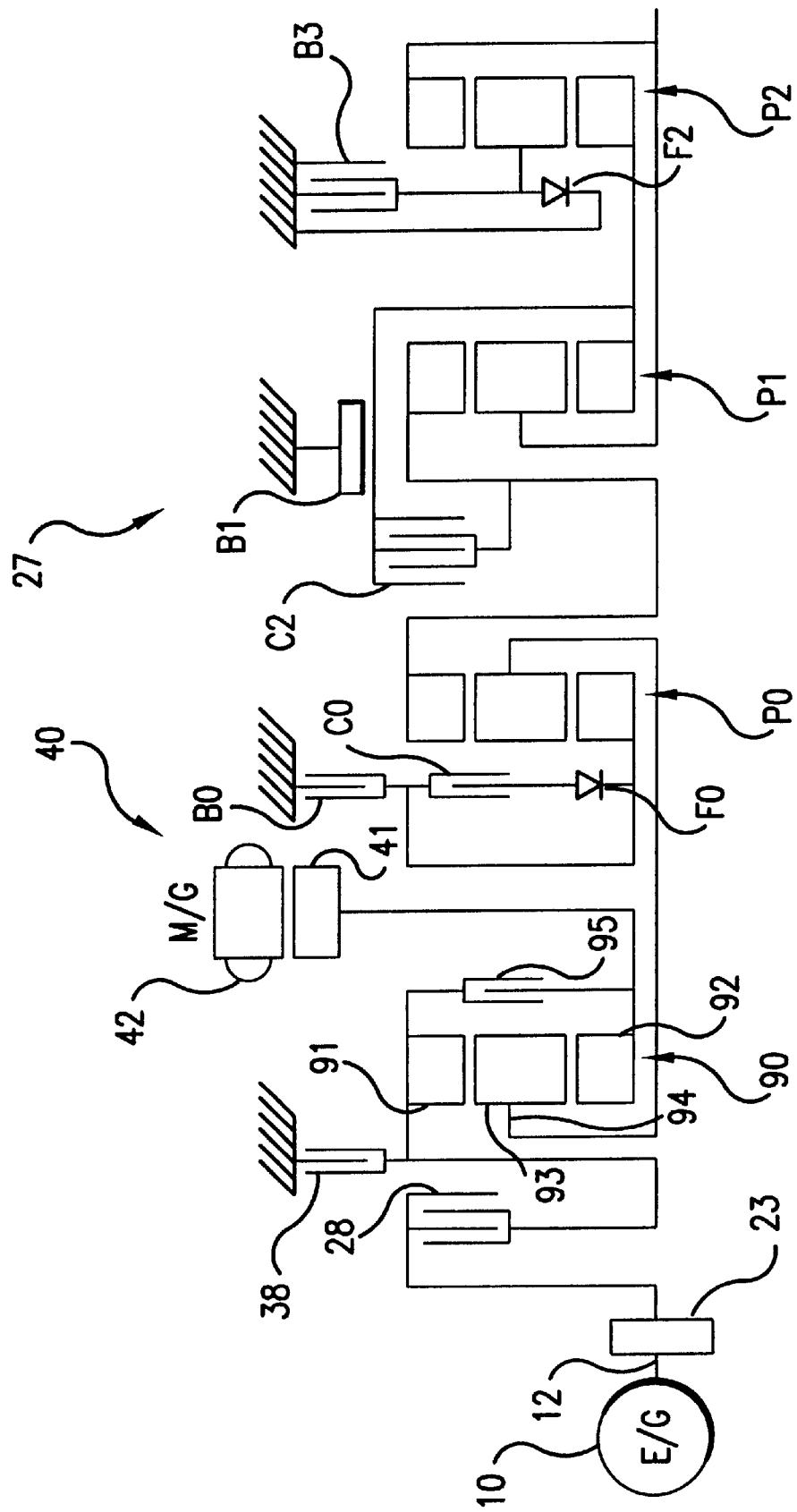
FIG. 12 is a skeleton diagram showing a modification of the power train of the vehicular drive unit according to the FIG. 9 embodiment of the invention.

Finally, FIG. 12 shows a modification in which the automatic transmission is simplified according to the additional provision of the split starting means using the planetary gear. The automatic transmission 27 in this embodiment is constructed to have a simplified mechanism by eliminating the clutch $C_1$, the brake B2 and the one-way clutch F1 of the aforementioned fourth embodiment, as apparent from contrast with FIG. 9. In the case of this drive unit, the reverse gear stage cannot be achieved by the automatic transmission itself so that the reverse stage in the "R" range is achieved by the electromotive drive of the motor generator 40. In this embodiment, therefore, the split starting means is equipped with a brake 38 for achieving the reverse stage. This brake 38 is adapted to stop the ring gear 91 of the planetary gear 90. As a result, the reverse stage of this case is achieved by setting the gear stage of the automatic transmission 27 to the 1st speed and by driving the motor generator 40 backward. The remaining structure is substantially similar to that of the fourth embodiment, and its description will be omitted by designating the equivalent members by the same reference numerals. The applications of the individual frictional engagement elements of the automatic transmission of this case are tabulated in FIG. 13.

The stopping control subroutine in the present embodiment is not basically different from the process of the foregoing fourth embodiment except the gear stage of Step S41. In the case of this automatic transmission, more specifically, the sun gear of the planetary gear (P2) is fixed by the application of the brake B1 at the 2nd speed of the "D" range so that the one-way clutch F2 is locked by the reverse rotation of the output shaft. As a result, the gear stage to be prevented from the backward rotation by the automatic transmission 27 in the motoring control of this embodiment is the aforementioned 2nd speed.

In the motoring control in the aforementioned individual embodiments, as described in detail hereinbefore, without cutting the fuel at the stopping time, the fuel injection is reduced to such a rate as to allow the stable rotation of the engine by itself, i.e., as to maintain the idling RPM, but also to allow driving of the accessories. Moreover, the short torque for the idling rotation is outputted by the motor generator 40. As a result, the fuel consumption rate for the idling is reduced. Moreover, the advantage of this state is that the catalyst temperature can be retained because the fuel combustion is always maintained to some extent. In addition, the engine 10 does not exert any load upon the motor generator 40 so that the load on the motor generator 40 can be lightened.

Thus, whatever of the aforementioned embodiments might be utilized, the drive states of the accessories can be retained. Moreover, since the fuel supply is not completely interrupted, the drop in the catalyst temperature can be suppressed, and the drive load on the motor generator can also be reduced to lower the load on the battery. Moreover, the restart can be prevented from puttering, as intrinsically aimed at by the motoring control, by retaining the idling RPM.

Although the invention has been described in connection with its four modes of embodiment together with their partial modifications, it could be practiced by modifying the specific detailed structure in various manners within the scope of the appended claims. For example, the condition for restoring the normal fuel supply of the engine during the stopping control when the brake is switched from ON to OFF may additionally have a condition that the shift position of the automatic transmission is in a range (e.g., "R", "D", "2" or "L" range) other than the "P" and "N" ranges. This is because when in the "P" and "N" ranges, even if the brake is OFF, the vehicle remains in the stopping state so that it is proper to continue the motoring control.

For preparing the restart of the vehicle when the brake is switched from ON to OFF during the motoring control, moreover, the control to set the gear stage of the automatic transmission to the 2nd speed might be added as a subsequent step to Step S31 or S47 in the stopping control subroutine. Then, it is possible to prevent the vehicle from abruptly starting.

According to the invention, at the vehicle stopping time, the motoring is carried out by setting the fuel supply to the engine to the predetermined rate lower than that of the idling time/RPM, so that the engine rotates while maintaining the idling RPM with the torque assist by the motor generator. According to the invention, therefore, it is possible to improve the mileage, to operate the accessories connected to and driven by the engine, while reducing the exhaust gas, and to prevent the puttering at the vehicle restart while suppressing the power consumption required for driving the motor generator.

According to the structure, moreover, the stopping condition of the vehicle is detected when the vehicle speed detected by the vehicle speed sensor is substantially at 0, when the throttle opening detected by the throttle sensor is in the fully closed state, and when the applied state detected by the brake sensor is at the brake ON position, so that the vehicle stopping condition can be reliably detected by those conditions.

According to the invention, moreover, the rotation of the engine is maintained at the RPM lower than the idling RPM, when the vehicular stopping time is long, so that the power consumption for driving the motor generator can be suppressed to a low value.

According to the structure, moreover, the control, in which the engine is assisted with the torque by the drive of the motor generator, is executed only when the electric storage of the battery has a surplus, so that the states, in which the electric storage of the battery is dropped to make the battery dead, can be prevented by driving the motor generator when the storage is small.

According to the invention, moreover, the unnecessary execution of the motoring control can be avoided till it is determined from the handle operation that the vehicle start is prepared, so that the start can be smoothed while preventing the conflict between the operation of the power steering unit having a high power consumption and the present control.

According to the invention, moreover, when the catalyst temperature is low, the engine is warmed up by the normal fuel supply to bring the catalyst function into a steady state so that the emission of insufficiently purified exhaust gas can be prevented.

According to the structure, moreover, when the brake is turned OFF during the motoring control, the engine is switched from the drive by the motor generator to the fuel supply so that it can be smoothly prepared for the restart. Since, the rotor of the motor generator has a considerable mass, it is continuously rotated by the inertial force even after the drive of the motor generator is stopped. If the first clutch is applied in that state, the application shocks appear because the shift unit is stopped. As a result, by causing the motor generator to generate the electric power to thereby absorb the inertial force and to stop the motor generator side, the shocks at the time of applying the first clutch can be eliminated. Moreover, the inertial force can be absorbed to store the energy.

According to the invention, moreover, when the hydraulic power transmission is interposed between the engine and the motor generator, the engine and the motor generator can be directly connected by applying the lockup clutch so that the loss for driving the engine by the motor generator can be eliminated. As a result, the electric power for driving the motor generator can be minimized.

According to the invention, moreover, in the construction having the hydraulic power transmission, the lockup clutch is released, and the motor generator is switched into the power generating state for the restart so that the restart can be quickened.

Next, according to the structure, in the vehicular drive unit in which the engine and the motor generator are combined and which is equipped with the planetary gear as the split starting means, the engine can be driven forward to effect the motoring by bringing the planetary gear into the split state to drive the motor generator backward. By setting the fuel supply to the engine to the predetermined rate smaller than that of the idling time/RPM when the vehicle is stopped, the engine is rotated to maintain the idling RPM with the torque assist by the motor generator. According to this system, therefore, it is possible to improve the mileage, to operate the accessories connected to and driven by the engine, while reducing the exhaust gas, and to prevent the puttering at the vehicle restart while suppressing the power consumption required for driving the motor generator.

Next, according to the invention, in the motoring control in the vehicular drive unit equipped with the planetary gear as the split starting means, the stopping state of the vehicle for the control can be properly detected.

Next, according to the structure, in the motoring control in the vehicular drive unit equipped with the planetary gear as the split starting means, the rotation of the engine is maintained at the RPM lower than the idling RPM, when the stopping time of the vehicle is long, so that the power consumption for driving the motor generator can be suppressed to a low rate.

Next, according to the invention, in the motoring control in the vehicular drive unit equipped with the planetary gear as the split starting means, the engine is assisted with the torque by the motor generator drive, only when the storage of the battery has a surplus. By driving the motor generator when the storage of the battery is low, it is possible to prevent the state in which the electric storage is lowered to make the battery dead.

Next, according to the invention, in the motoring control in the vehicular drive unit equipped with the planetary gear as the split starting means, it is possible to avoid the execution of the motoring control till it is determined from the handle operation that the vehicle start is prepared. As a result, the start can be smoothed while preventing the conflict between the operations of the power steering unit consuming a high power consumption and the present control.

Next, according to the invention, in the motoring control in the vehicular drive unit equipped with the planetary gear as the split starting means, when the catalyst temperature is low, the engine is warmed up by the normal fuel supply to bring the catalyst function into a steady state so that the emission of the insufficiently purified exhaust gas can be prevented.

Next, according to the invention, in the motoring control in the vehicular drive unit equipped with the planetary gear as the split starting means, the torque acts in the backward direction upon the output element of the planetary gear so that the stopping state of the vehicle can be reliably retained by setting the transmission for preventing the backward rotation, either when the depression of the vehicle brake is weakened or at the stopping time on a slope.

According to the invention, moreover, the motoring control in the vehicular drive unit equipped with the planetary gear as the split starting means, can be released by releasing the brake to thereby to establish the idling state prepared for the restart, so that the restart can be further smoothened.

According to the invention, moreover, in the motoring control, the retention of the rotation of the engine itself is achieved by supplying the fuel in a necessary amount so that the load upon the motor generator can be accordingly reduced.

What is claimed is:

1. A control system for a vehicle comprising:
an engine;
a motor connected to an output shaft of said engine and acting, at least, as a motor for driving the output shaft of said engine;
a battery for storing electric power and for supplying electric power to drive said motor;
a first clutch for connecting said motor and wheels;
stopping state detector that detects a stopping state of the vehicle; and
a controller that controls said engine, said motor and said first clutch, wherein when the stopping state is detected by said stopping state detector, said controller releases said first clutch, sets a fuel supply to said engine to a rate lower than that of an idling RPM, and feeds electric power to said motor to maintain a rotation of said engine substantially at an idling RPM by the drive of said motor.

2. The control system for a vehicle according to claim 1, further comprising:
a vehicle speed sensor for detecting a vehicle speed;
a throttle sensor for detecting a throttle opening; and
a brake sensor for detecting an applied state of a brake, wherein said motor is also a motor generator that acts as a power generator for recovering energy from the wheels and said stopping state detector detects the stopping state of the vehicle when the vehicle speed detected by said vehicle speed sensor is substantially at 0, when the throttle opening detected by said throttle sensor is in a fully closed state, and when an ON applied state of the brake is detected by said brake sensor.

3. The control system for a vehicle according to claim 2, further comprising a second clutch for connecting said engine and said motor generator, wherein when the applied state of the brake detected by said brake sensor is switched from the ON applied state to an OFF unapplied state with said motor generator being in a drive state, said controller returns the fuel supply to said engine to the rate of the idling RPM, stops the drive of said motor generator, releases said second clutch, brings said motor generator into a power generating state, and applies said first clutch.

4. The control system for a vehicle according to claim 2, further comprising a hydraulic power transmission having a lockup clutch between said engine and said motor generator, wherein when the stopping state of the vehicle is detected by said stopping state detector, said controller releases said first clutch, applies said lockup clutch, sets the fuel supply to said engine to the rate lower than that of the idling RPM, and feeds electric power to said motor generator to bring said motor generator into a drive state to thereby maintain the rotation of said engine substantially at the idling RPM.

5. The control system for a vehicle according to claim 4, wherein when the applied state of the brake detected by said brake sensor is switched from the ON applied state to the OFF unapplied state with said motor generator being in the drive state, said controller returns the fuel supply to said engine to the rate of the idling RPM, stops the drive of said motor generator, releases said lockup clutch, brings said motor generator into a power generating state, and applies said first clutch.

6. The control system for a vehicle according to claim 1, wherein said controller includes a stopping time meter that meters a stopping time of the vehicle and said controller lowers a torque of said motor generator when the stopping time is over a predetermined value so that the rotation of said engine may be maintained at a predetermined RPM smaller than the idling RPM.

7. The control system for a vehicle according to claim 1, further comprising a storage detector that detects an electric storage of said battery, wherein when the stopping state of the vehicle is detected by said stopping state detector and when the electric storage of said battery detected by said storage detector is over a predetermined value, said controller releases said first clutch, sets the fuel supply to said engine to the rate lower than that of the idling RPM, and feeds electric power to said motor to bring said motor into a drive state to thereby maintain the rotation of said engine substantially at the idling RPM.

8. The control system for a vehicle according to claim 1, further comprising a power steering switch for detecting an engagement of a power steering, wherein when the stopping state of the vehicle is detected by said stopping state detector and when said power steering switch detects that said power steering is engaged, said controller releases said first clutch, sets the fuel supply to said engine to the rate lower than that of the idling RPM, and feeds electric power to said motor to bring said motor into a drive state to thereby maintain the rotation of said engine substantially at the idling RPM.

9. The control system for a vehicle according to claim 1, further comprising a catalyst temperature sensor for detecting a catalyst temperature of a catalyst, wherein when the stopping state of the vehicle is detected by said stopping state detector and when the catalyst temperature detected by said catalyst temperature sensor is over a predetermined value, said controller releases said first clutch, sets the fuel supply to said engine to the rate lower than that of the idling RPM, and feeds electric power to said motor to bring said motor into a drive state to thereby maintain the rotation of said engine substantially at the idling RPM.

10. A control system for a vehicle comprising:
   an engine;
   a motor generator connected to an output shaft of said engine and acting as a power generator for recovering energy from wheels of the vehicle and as a motor for driving the output shaft of said engine;
   a battery for storing the energy recovered by said motor generator as electric power and for supplying electric power to drive said motor generator;
   a planetary gear for connecting said engine, said motor generator and wheels in a drive manner;
   a direct clutch for connecting said planetary gear directly;
   stopping state detector that detects a stopping state of the vehicle; and
   a controller that controls said engine, said motor generator and said direct clutch, wherein when the stopping state is detected by said stopping state detector, said controller releases said direct clutch, sets a fuel supply to said engine to a rate lower than that of an idling RPM, and feeds electric power to said motor generator to maintain a rotation of said engine substantially at the idling RPM by a reverse drive of said motor generator.

11. The control system for a vehicle according to claim 10, further comprising:
   a vehicle speed sensor for detecting a vehicle speed;
   a throttle sensor for detecting a throttle opening; and
   a brake sensor for detecting an applied state of a brake, wherein said stopping state detector detects the stopping state of the vehicle when the vehicle speed detected by said vehicle speed sensor is substantially at 0, when the throttle opening detected by said throttle sensor is in a fully closed state, and when an ON applied state of the brake is detected by said brake sensor.

12. The control system for a vehicle according to claim 10, further comprising an automatic transmission between said planetary gear and the wheels, wherein said controller includes a shift controller for shift-controlling said automatic transmission, and wherein when the stopping state is detected by said stopping state detector, said controller shifts gear stages of said automatic transmission to a value substantially equal to one for preventing reverse rotation and then releases said direct clutch, sets the fuel supply to said engine to the rate lower than that of an idling RPM, and feeds electric power to said motor generator to maintain the rotation of said engine substantially at the idling RPM by the reverse drive of said motor generator.

13. The control system for a vehicle according to claim 11, wherein when the applied state of the brake detected by said brake sensor is switched from the ON applied state to an OFF unapplied state with said motor generator being in the drive state, said controller returns the fuel supply to said engine to the rate of the idling RPM.

14. The control system for a vehicle according to claim 10, wherein said controller includes a stopping time meter that meters a stopping time of the vehicle, said controller lowers a torque of said motor generator when the stopping time is over a predetermined value so that the rotation of said engine may be maintained at a predetermined RPM smaller than the idling RPM.

15. The control system for a vehicle according to claim 10, further comprising a storage detector that detects an electric storage of said battery, wherein when the stopping state of the vehicle is detected by said stopping state detector and when the electric storage of said battery detected by said storage detector is over a predetermined value, said controller releases said direct clutch, sets the fuel supply to said engine to the rate lower than that of the idling RPM, and feeds electric power to said motor generator to bring said motor generator into a drive state to thereby maintain the rotation of said engine substantially at the idling RPM.

16. The control system for a vehicle according to claim 10, further comprising a power steering switch for detecting an engagement of a power steering, wherein when the stopping state of the vehicle is detected by said stopping state detector and when said power steering switch detects that said power steering is engaged, said controller releases said direct clutch, sets the fuel supply to said engine to the rate lower than that of the idling RPM, and feeds electric power to said motor generator to bring said motor generator into a drive state to thereby maintain the rotation of said engine substantially at the idling RPM.

17. The control system for a vehicle according to claim 10, further comprising a catalyst temperature sensor for detecting a catalyst temperature of a catalyst, wherein when the stopping state of the vehicle is detected by said stopping state detector and when the catalyst temperature detected by said catalyst temperature sensor is over a predetermined value, said controller releases said direct clutch, sets the fuel supply to said engine to the rate lower than that of the idling RPM, and feeds an electric power to said motor generator to bring said motor generator into a drive state to thereby maintain the rotation of said engine substantially at the idling RPM.

18. The control system for a vehicle according to claim 10, wherein the rate lower than that of the idling RPM is set to at least a value to maintain the rotation of said engine.

19. A control system for a vehicle comprising:
   an engine;
   motor generator means connected to an output shaft of said engine and acting as a power generator for recovering energy from wheels and as a motor for driving the output shaft of said engine;
   a battery for storing the energy recovered by said motor generator as electric power and for supplying electric power to drive said motor generator;

first clutch means for connecting said motor generator and the wheels;

means for detecting a stopping state of the vehicle; and means for controlling said engine, said motor generator means and said first clutch means, wherein when the stopping state is detected by said stopping state detecting means, said control means releases said first clutch means, sets a fuel supply to said engine to a rate lower than that of an idling RPM, and feeds electric power to said motor generator means to maintain a rotation of said engine substantially at an idling RPM by the drive of said motor generator means.

20. The control system for a vehicle according to claim 19, further comprising:

vehicle speed sensor means for detecting a vehicle speed;

throttle sensor means for detecting a throttle opening; and brake sensor means for detecting an applied state of a brake, wherein said stopping state detecting means detects the stopping state of the vehicle when the vehicle speed detected by said vehicle speed sensor means is substantially at 0, when the throttle opening detected by said throttle sensor means is in a fully closed state, and when an ON applied state of the brake is detected by said brake sensor means.

21. The control system for a vehicle according to claim 20, further comprising a second clutch means for connecting said engine and said motor generator means, wherein when the applied state of the brake detected by said brake sensor means is switched from the ON applied state to an OFF unapplied state with said motor generator means being in a drive state, said control means returns the fuel supply to said engine to the rate of the idling RPM, stops the drive of said motor generator means, releases said second clutch means, brings said motor generator means into a power generating state, and applies said first clutch means.

22. The control system for a vehicle according to claim 20, further comprising a hydraulic power transmission having a lockup clutch between said engine and said motor generator means, wherein when the stopping state of the vehicle is detected by said stopping state detecting means, said control means releases said first clutch means, applies said lockup clutch, sets the fuel supply to said engine to the rate lower than that of the idling RPM, feeds electric power to said motor generator means to bring said motor generator means into a drive state to thereby maintain the rotation of said engine substantially at the idling RPM.

23. The control system for a vehicle according to claim 22, wherein when the applied state of the brake detected by said brake sensor means is switched from the ON applied state to an OFF unapplied state with said motor generator means being in the drive state, said control means returns the fuel supply to said engine to the rate of the idling RPM, stops the drive of said motor generator means, releases said lockup clutch, brings said motor generator means into a power generating state, and applies said first clutch means.

24. The control system for a vehicle according to claim 19, wherein said controlling means includes stopping time metering means for metering a stopping time of the vehicle, said control means lowers a torque of said motor generator means when the stopping time is over a predetermined value so that the rotation of said engine may be maintained at a predetermined RPM smaller than the idling RPM.

25. The control system for a vehicle according to claim 19, further comprising storage detecting means for detecting an electric storage of said battery, wherein when the stopping state of the vehicle is detected by said stopping state detecting means and when the electric storage of said battery detected by said storage detecting means is over a predetermined value, said control means releases said first clutch means, sets the fuel supply to said engine to the rate lower than that of the idling RPM, and feeds electric power to said motor generator means to bring said motor generator means into a drive state to thereby maintain the rotation of said engine substantially at the idling RPM.

26. The control system for a vehicle according to claim 19, further comprising a power steering switch means for detecting an engagement of a power steering, wherein when the stopping state of the vehicle is detected by said stopping state detecting means and when said power steering switch means detects that said power steering is engaged, said control means releases said first clutch means, sets the fuel supply to said engine to the rate lower than that of the idling RPM, and feeds an electric power to said motor generator means to bring said motor generator means into a drive state to thereby maintain the rotation of said engine substantially at the idling RPM.

27. The control system for a vehicle according to claim 19, further comprising a catalyst temperature sensor means for detecting a catalyst temperature of a catalyst, wherein when the stopping state of the vehicle is detected by said stopping state detecting means and when the catalyst temperature detected by said catalyst temperature sensor means is over a predetermined value, said control means releases said first clutch, sets the fuel supply to said engine to the rate lower than that of the idling RPM, and feeds electric power to said motor generator means to bring said motor generator means into a drive state to thereby maintain the rotation of said engine substantially at the idling RPM.

28. A control system for a vehicle comprising:

an engine;

motor generator means connected to an output shaft of said engine and acting as a power generator for recovering the energy from wheels of the vehicle and as a motor for driving the output shaft of said engine;

a battery for storing the energy recovered by said motor generator means as electric power and for supplying electric power to drive said motor generator means;

planetary gear means for connecting said engine, said motor generator means and wheels in a drive manner;

direct clutch means for connecting said planetary gear means directly;

stopping state detecting means for detecting a stopping state of the vehicle; and control means for controlling said engine, said motor generator and said direct clutch means, wherein when the stopping state is detected by said stopping state detecting means, said control means releases said direct clutch means, sets a fuel supply to said engine to a rate lower than that of an idling RPM, and feeds electric power to said motor generator means to maintain the rotation of said engine substantially at the idling RPM by a reverse drive of said motor generator means.

29. The control system for a vehicle according to claim 28, further comprising:

a vehicle speed sensor means for detecting a vehicle speed;

a throttle sensor means for detecting a throttle opening; and a brake sensor means for detecting an applied state of a brake, wherein said stopping state detecting means detects the stopping state of the vehicle when the vehicle speed detected by said vehicle speed sensor means is substantially at 0, when the throttle opening detected by said throttle sensor means is in a fully closed state, and when an ON applied state of the brake is detected by said brake sensor means.

30. The control system for a vehicle according to claim 28, wherein said control means includes stopping time metering means for metering a stopping time of the vehicle, said control means lowers a torque of said motor generator means when the stopping time is over a predetermined value so that the rotation of said engine may be maintained at a predetermined RPM smaller than the idling RPM.

31. The control system for a vehicle according to claim 28, further comprising storage detecting means for detecting an electric storage of said battery, wherein when the stopping state of the vehicle is detected by said stopping state detecting means and when the electric storage of said battery detected by said storage detecting means is over a predetermined value, said control means releases said direct clutch means, sets the fuel supply to said engine to the rate lower than that of the idling RPM, and feeds electric power to said motor generator means to bring said motor generator means into a drive state to thereby maintain the rotation of said engine substantially at the idling RPM.

32. The control system for a vehicle according to claim 28, further comprising a power steering switch means for detecting an engagement of a power steering, wherein when the stopping state of the vehicle is detected by said stopping state detecting means and when said power steering switch means detects that said power steering is engaged, said control means releases said direct clutch means, sets the fuel supply to said engine to the rate lower than that of the idling RPM, and feeds electric power to said motor generator means to bring said motor generator means into a drive state to thereby maintain the rotation of said engine substantially at the idling RPM.

33. The control system for a vehicle according to claim 28, further comprising a catalyst temperature sensor means for detecting a catalyst temperature of a catalyst, wherein when the stopping state of the vehicle is detected by said stopping state detecting means and when the catalyst temperature detected by said catalyst temperature sensor means is over a predetermined value, said control means releases said direct clutch means, sets the fuel supply to said engine to the rate lower than that of the idling RPM, and feeds electric power to said motor generator means to bring said motor generator means into a drive state to thereby maintain the rotation of said engine substantially at the idling RPM.

34. The control system for a vehicle according to claim 28, further comprising an automatic transmission between said planetary gear means and the wheels, wherein said control means includes shift control means for shift-controlling said automatic transmission, and wherein when the stopping state is detected by said stopping state detecting means, said control means shifts gear stages of said automatic transmission to a value substantially equal to one for preventing reverse rotation and then releases said direct clutch means, sets the fuel supply to said engine to the rate lower than that of an idling RPM, and feeds electric power to said motor generator means to maintain the rotation of said engine substantially at the idling RPM by the reverse drive of said motor generator means.

35. The control system for a vehicle according to claim 29, wherein when the applied state of the brake detected by said brake sensor is switched from the ON applied state to an OFF unapplied state with said motor generator means being in a drive state, said control means returns the fuel supply to said engine to the rate of the idling RPM.

36. The control system for a vehicle according to claim 28, wherein the rate lower than that of the idling RPM is set to at least a value to maintain the rotation of said engine.

37. A method of controlling a vehicle including an engine, a motor generator connected to the output shaft of said engine to act as a power generator for recovering the energy from the wheels of the vehicle and as a motor for driving the output shaft of said engine, a battery for storing the energy recovered by said motor generator and for supplying electric power to drive said motor generator, and a first clutch to connect the motor generator and the wheels, the method comprising the steps of:

detecting that the vehicle is in a stopped state; and
performing the following steps upon detection that the vehicle is in the stopped state:
releasing the first clutch;
setting the supply of fuel to said engine to a rate lower than that of an idling RPM; and
feeding electric power to said motor generator to maintain a rotation of said engine substantially at an idling RPM by the drive of said motor generator.

38. The method of controlling a vehicle according to claim 37, wherein the step of detecting that the vehicle is in a stopped state includes the steps of:

detecting that a vehicle speed is substantially at 0;
detecting that a throttle opening is in a fully closed position; and
detecting that a brake is in an applied state.

39. The method of controlling a vehicle according to claim 37, wherein the method further comprises the steps of:

detecting when a brake sensor is switched from an applied state to an unapplied state when the motor generator is in a drive state; and
performing the following steps upon detection that the brake is in the unapplied state:
returning the fuel supply to said engine to a rate of the idling RPM;
stopping the drive of said motor generator;
releasing a second clutch connecting the engine and said motor generator;
bringing the motor generator into a power generating state; and
applying the first clutch.

* * * * *